Aug. 10, 1965 R. M. HAINES 3,200,271
BOLOMETER
Filed July 23, 1962

INVENTOR.
ROBERT M. HAINES
BY Edward H Lang
ATTORNEY 3,200,271
BOLOMETER

Robert M. Haines, Crystal Lake, Ill., assignor to The Pure Oil Company, Chicago, Ill., a corporation of Ohio
Filed July 23, 1962, Ser. No. 211,659
9 Claims. (Cl. 310—8.9)

Figures 1, 2:
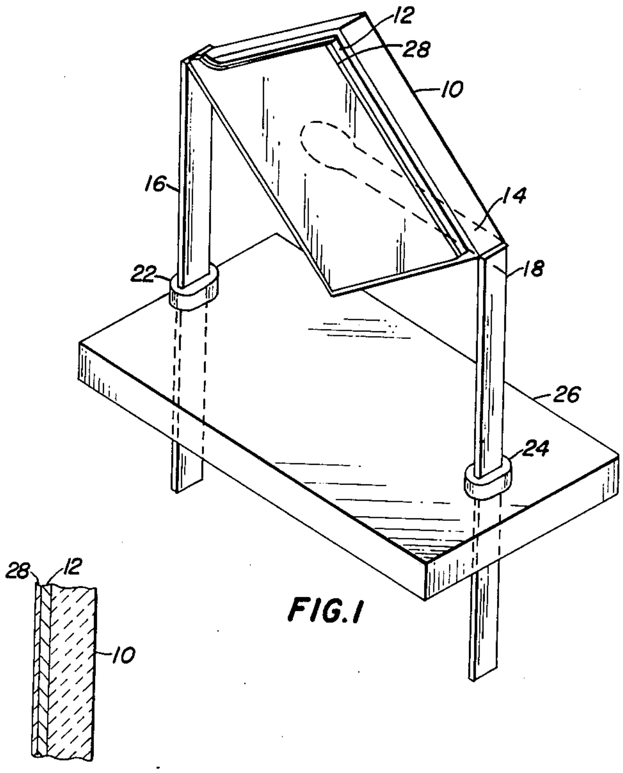

This invention relates to bolometers, and more particularly to sensitive bolometers employing piezoelectric crystals.

All bodies radiate infrared energy, and by the use of an appropriate heat sensing device such as a bolometer, in conjunction with a suitable optical system, it is possible to detect the presence of an infrared radiating body.

Two factors which seriously limit the effectiveness of infrared detecting devices are lack of sensitivity of the detecting element, or bolometer, and the slowness of response of the bolometer to change in the level of radiant energy. Time-constant and sensitivity are interdependent in most detecting devices, and heretofore it has been necessary to compromise sensitivity in order to achieve satisfactory time response. Thus, it may be shown that for any given heat-detecting system, an increase in sensitivity is achieved only by a proportional decrease in rate of response, and conversely, that a quickening rate of response is accompanied by a decrease in sensitivity. Where the heat-detecting devices employed must detect rapid changes of the level of radiant energy received, and also must be sensitive to low levels of radiation, a serious design problem exists.

It is therefore an object of this invention to provide a novel type of bolometer which provides both rapid time response and a high degree of sensitivity. Other objects of the invention will become apparent from the following description.

Figure 3:
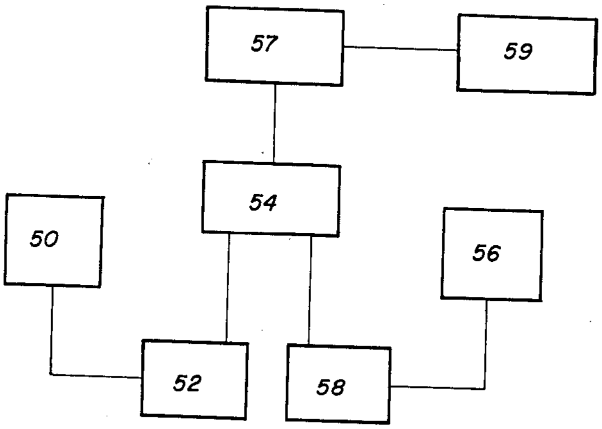

Referring to the drawings:

FIGURE 1 is a perspective view of a bolometer fabricated in accordance with this invention, FIGURE 2 is a fragmentary view of the crystal of the apparatus of FIGURE 1, and FIGURE 3 is a block diagram of a circuit which may be used in conjunction with the novel bolometer.

Quartz crystal 10 is provided with a thin, metallic coating 12 which substantially covers one of the two parallel major faces of the crystal. The rear face of the crystal is provided with a conventional gold plate electrode 14 which extends slightly more than ½ of the distance between diagonal corners of the rear crystal face. Coating 12 serves both as an electrode and as radiation responsive means for stressing the crystal, as will later be explained. Metallic coatings 12 is connected at one corner of the crystal to conducting support wire 16, and gold electrode 14 is connected to conducting supports wire 18. Support wires 16 and 18 are attached to terminals 22 and 24 which are mounted in and extend through base member 26. Base member 26 is fabricated of an electrically insulating material. Substantially coextensive with metallic coating 12 is a thin layer 28 of a blackening material which has a high radiant energy absorption efficiency.

Radiant energy absorbed by layer 28 heats the thin metallic layer 12, which layer preferably has a high coefficient of thermal expansion, at least twice the lesser coefficient of expansion of the face of crystal 10. Expansion of coating 12 causes distortion of the crystal and a corresponding change in crystal frequency.

Piezoelectric crystal 10, which may be of quartz, will preferably be cut to have a low thermal sensitivity, since the crystal itself serves as a heat sink to receive heat from metallic layer 12 and thereby return the layer to its initial condition of temperature when the level of radiation is reduced from a higher to a lower value. A substantial improvement in time response of the bolometer is achieved due to the efficient transfer of heat from metallic layer 12 to the crystal. Since the action of the bolometer is dependent upon stresses applied to the crystal due to the expansion of the metallic layer 12, and not due to actual temperature change of the crystal, which would be extremely slow, it is desirable that the crystal be cut to minimize rather than maximize the frequency response to change of temperature. AT or BT cut crystal blanks, for example, are suitable.

It is desirable that the metal which comprises coating 12 have a coefficient of linear thermal expansion of at least $11 \times 10^{-6}$ per degree F. It has been found necessary that the coefficient of thermal expansion of the metal be at least twice the minimum linear coefficient of thermal expansion of the crystal face. As is well known, piezoelectric crystals generally display different coefficients of linear thermal expansion in different directions. The linear coefficient of thermal expansion of the coating 12 must be at least twice that of the lesser coefficient of the crystal face.

In order to achieve satisfactory time response, it is necessary that the layer 12 be very thin, preferably between 1 and 100 millionths of an inch. The thickness of the crystal itself is not critical, but preferably will be about 10 thousandths of an inch. The use of extremely thin metallic layers will be found to enhance the time response of the bolometer, but with some decrease in sensitivity. It has further been found that in order to provide a satisfactory compromise between sensitivity and time response, it is necessary that the coating 12 be characterized by a specific heat of less than about 0.1. This is essential to provide a satisfactory heating and cooling of the layer 12.

Examples of metals which meet the foregoing requirements are zinc, tin, and lead. Zinc is especially preferred for its high linear coefficient of thermal expansion and coefficient of light absorption. Lead is especially useful in some applications because of its extremely low specific heat. The layer 12 can be applied to the crystal by conventional techniques, as for example is described in U.S. Patent 2,639,392 to A. W. Warner. The coating 28 of blackening material may be formed of any of a variety of substances. For example, a very thin coat of aluminum black can be deposited on the metal coating by evaporation at about 4 millimeters of hydrogen. The best thickness about doubles the sensitivity of the bolometer, thicker coats will absorb more energy, but the gain is more than offset by the increase in time constant. It is preferred to deposit the aluminum black until the coefficient of absorption of the surface reaches a value of about 0.9. Satisfactory results can be obtained where the coefficient of light absorption of the bolometer surface is not less than about 0.5. Accordingly, when zinc is employed in forming the layer 12, the use of a layer 28 can be omitted, since the zinc itself has a coefficient of light absorption greater than 0.5. It is preferred that at ambient temperatures the coating 12 exist in a state of stress of about 1000 to 10,000 p.s.i. This imposes a continuous strain on the crystal, which strain is decreased when the coating expands due to temperature rise. This has been found to be desirable to ensure that the coating operates continuously in a state of tensile stress, rather than in compressive stress, and conversely the crystal is always subjected to a compressive stress, rather than a tensile stress. This can readily be accomplished by vaporizing the metal layer onto the face of the crystal at an elevated temperature, whereby due to the difference in coefficient of linear thermal expansion of the crystal and metal, the metallic layer will be subjected to stress as the bolometer returns to ambient operating temperatures. The amount by which the temperature of the crystal should be increased during the application of the layer 12 to the crystal will of course depend upon the coefficients of the crystal and of the metal selected to comprise the layer. Generally, satisfactory results are obtained by applying the coating at a temperature in the range of about 20° to 100° F. above the ambient operating temperature of the bolometer.

It will be evident to those skilled in the art that the bolometer may be employed in conjunction with any of the many prior art electronic circuits adapted to detect and display rapid changes in frequency of a crystal. An example of a heterodyne circuit which may be used with the bolometer is shown in block from in FIGURE 3. Bolometer 50 is connected to an oscillator 52 which in turn is connected to mixer 54. A shielded reference crystal 56, which is preferably physically located in the same thermal environment as crystal 50, is connected to oscillator 58, which, in turn, is connected to mixer 54. The output of mixer 54 is fed through amplifier 57 to a frequency shift detection circuit 59, which can be an oscillograph. The bolometer of this invention can be used in conjunction with conventional optical systems. Such optical system can be of the fixed or target area scanning type.

The embodiments of the invention in which an exclusive property or privilege is claimed are defined follows:

1. A bolometer comprising a wafer-like piezoelectric crystal having two parallel faces, said crystal faces having different coefficients of linear thermal expansion in different directions at least a major portion of one of said faces being covered with an adherent coating of a metal having a coefficient of linear thermal expansion at least twice the minimum linear coefficient of thermal expansion of said crystal face, said coating being further characterized by a specific heat of less than about 0.1, and a coefficient of absorption of light of not less than about 0.5, and electrode means operatively connected to each of said parallel faces of the crystal.

2. A device in accordance with claim 1 in which said coating is of zinc.

3. A device in accordance with claim 1 in which said coating is under a tensile stress of about 1000 to 10,000 p.s.i. when said bolometer is at ambient temperatures.

4. A bolometer comprising a wafer-like piezoelectric crystal having two parallel faces, said crystal faces having different coefficients of linear thermal expansion in different directions at least a major portion of one of said faces being covered with an adherent coating of a metal having a coefficient of linear thermal expansion at least twice the minimum linear coefficient of thermal expansion of said crystal face, said coating being further characterized by a specific heat of less than about 0.1, a thin layer of blackening material substantially covering said coating, whereby the coefficient of absorption of the light of the coated bolometer surface is about 0.5 to 0.9, and electrode means operatively connected to each said parallel face of the crystal.

5. A device in accordance with claim 4 in within the coefficient of linear thermal expansion of said coating is not less than about $11\times10^{-6}$ per degree F.

6. A device in accordance with claim 5 in which said metal is selected from the group consisting of zinc, tin, and lead.

7. A device in accordance with claim 5 in which said coating is of lead.

8. A device in accordance with claim 5 in which said coating exists under a tension of about 1000 to 10,000 p.s.i. when said bolometer is at ambient temperatures.

9. A device in accordance with claim 6 in which the blackening material is aluminum black.

No references cited.

MILTON O. HIRSHFIELD, *Primary Examiner*